United States Patent
Inoue et al.

(10) Patent No.: US 10,934,403 B2
(45) Date of Patent: Mar. 2, 2021

(54) HEAT-SHRINKABLE POLYESTER FILM AND PACKAGING

(71) Applicant: TOYOBO CO., LTD., Osaka (JP)

(72) Inventors: Masafumi Inoue, Tsuruga (JP); Masayuki Haruta, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 27 days.

(21) Appl. No.: 16/322,282

(22) PCT Filed: Jul. 31, 2017

(86) PCT No.: PCT/JP2017/027695
§ 371 (c)(1),
(2) Date: Jan. 31, 2019

(87) PCT Pub. No.: WO2018/025801
PCT Pub. Date: Feb. 8, 2018

(65) Prior Publication Data
US 2019/0169386 A1    Jun. 6, 2019

(30) Foreign Application Priority Data
Aug. 1, 2016 (JP) .............................. JP2016-151010

(51) Int. Cl.
*C08J 5/18* (2006.01)
*C08L 67/02* (2006.01)

(52) U.S. Cl.
CPC ................. *C08J 5/18* (2013.01); *C08L 67/02* (2013.01); *C08J 2367/02* (2013.01); *C08J 2367/03* (2013.01); *C08J 2467/02* (2013.01)

(58) Field of Classification Search
USPC .............................. 528/308.6, 190, 193, 194
See application file for complete search history.

(56) References Cited

U.S. PATENT DOCUMENTS

| 5,340,624 A | 8/1994 | Sublett |
| 8,632,865 B2 * | 1/2014 | Kim .......................... C08J 5/18 |
| | | 428/34.9 |

FOREIGN PATENT DOCUMENTS

| JP | H03-045631 A | 2/1991 |
| JP | H07-053737 A | 2/1995 |
| JP | H08-239460 A | 9/1996 |
| JP | H09-501713 A | 2/1997 |
| JP | 2003-082128 A | 3/2003 |
| JP | 2003-154539 A | 5/2003 |
| JP | 2007-056156 A | 3/2007 |

OTHER PUBLICATIONS

Japanese Patent Office, International Search Report in International Patent Application No. PCT/JP2017/027695 (dated Oct. 17, 2017).

* cited by examiner

*Primary Examiner* — Terressa Boykin
(74) *Attorney, Agent, or Firm* — Leydig, Voit & Mayer, Ltd.

(57) ABSTRACT

The invention provides a heat-shrinkable polyester film, which has a main shrinkage direction in a longer direction, exhibits a higher shrinkage ratio in the main shrinkage direction, has small difference in shrinkage ratio at a high temperature and a low temperature so as not likely to generate wrinkles or the like when being used as a label, and exhibits small over-time decrease in shrinkage ratio at a low temperature. The heat-shrinkable polyester film has, as a main component, ethyleneterephthalate, and an amount of a diethyleneglycol (DEG) component is 10-25 mol % with respect to 100 mol % of a polyhydric alcohol component in all of polyester resin that composes the film.

16 Claims, No Drawings

HEAT-SHRINKABLE POLYESTER FILM AND PACKAGING

CROSS-REFERENCE TO RELATED APPLICATIONS

This patent application is the U.S. national phase of International Patent Application No. PCT/JP2017/027695, filed Jul. 31, 2017, which claims the benefit of Japanese Patent Application No. 2016-151010, filed on Aug. 1, 2016, which are incorporated by reference in their entireties herein.

TECHNICAL FIELD

The present invention relates to a heat-shrinkable polyester film and a packaging, and more specifically relates to a heat-shrinkable polyester film which is suitably used for a purpose of labels of drink bottles, exhibits a higher shrinkage ratio in a longer direction, has small difference in shrinkage ratio at a high temperature and a low temperature so as not likely to generate wrinkles or the like when being used as a label, and exhibits small over-time decrease in shrinkage ratio at a low temperature, and a packaging using the label.

BACKGROUND ART

Recently, for purposes of label packaging, cap sealing, assembling packaging and the like, which serves as both of: protection of a glass bottle, a PET bottle or the like; and display of a product, drawn film made of polyvinyl chloride resin, polystyrene resin, polyester resin or the like (so-called a heat-shrinkable film) has been used widely. Among these heat-shrinkable films, a polyvinyl chloride film has problems that it has low heat resistance, generates hydrogen chloride gas while it is burnt, causes to generate dioxin and the like. Further, a polystyrene film has problems that it has poor solvent resistance, requires to use ink having a special composition for printing, requires to be burnt at a high temperature, and generates much black smoke with bad smell while it is burnt. Thus, polyester heat-shrinkable films which have high heat resistance, can be burnt easily and have superior solvent resistance have been used widely as shrinkable labels, and their using amount tends to be increased according to the increase of the distribution amount of PET cases.

Further, as a usual heat-shrinkable polyester film, a film that can be largely shrunk in a width direction has been widely used. However, in the case of using such a film as a label film for a drink bottle, since this film is required to be shrunk in a circumferential direction by heat after it is attached to the bottle, it is necessary to make a hoop of this film so that its width direction may be the circumferential direction, cut the hoop to have a predetermined length, and then attach this hoop around the bottle or a lunch box container by hand or the like. Thus, it is difficult to attach a label film made of a heat-shrinkable film that is shrunk in a width direction by heat around a bottle or a lunch box container at high speed. Therefore, a film, which is shrunk in a longer direction so that it can be attached a bottle so as to be wound therearound directly from a film roll, has been recently demanded. Thereby, a center sealing process for forming a film tube and sealing the tube and working for cutting, attaching the film by hand and the like become unnecessary, so that the attachment can be carried out at high speed.

Whereas, conventional heat-shrinkable polyester films which are shrunk in their width directions by heat have been also sought to have further improved shrinkage properties. In particular, shrinkage unevenness or wrinkles are sometimes generated while shrinking such a film, whereby letters or a design that is printed on the film before the shrinking may be distorted while coating and shrinking the film around a case such as a PET bottle, a polyethylene bottle and a glass bottle, and users have demanded to the minimize this distortion to the smallest possible.

Several means for increasing low temperature shrinkability of films and improving appearance after shrinking have been reported so far. For example, in Patent Document 1, neopentylglycol and/or 1,4-cyclohexanedimethanol is used as a monomer of a polyhydric alcohol component that can be an amorphous component, thereby providing shrinkability at a low temperature. However, it has been known that, in the case of using the above-described monomer, over-time decrease of a low temperature shrinkage ratio is significant. It can be considered that, if storing the film after film formation for a long period, the low temperature shrinkability of the film is lost, whereby wrinkles are likely to be generated during shrinkage finish. For suppressing the over-time decrease of the low temperature shrinkage ratio, it becomes necessary to store the film at low temperature, thereby requiring the cost.

Further, in Patent Document 2, 1,4-butanediol is used as a polyhydric alcohol component so as to decrease a glass transition temperature and improve low temperature shrinkability of a film, but since it is known that the use of 1,4-butanediol decreases a shrinkage ratio at a high temperature, lack of shrinkage is considered to be caused, whereby the use of 1,4-butanediol is not preferable in terms of the shrinkage finish. Also, the use of 1,4-butanediol is not preferable, because it is known that its use causes a significant decrease of a low temperature shrinkage ratio over time.

PRIOR ART DOCUMENTS

Patent Documents

Patent Document 1: JP-A-2007-56156

Patent Document 2: JP-A-2003-82128

SUMMARY OF THE INVENTION

Problems to be Solved by the Invention

The present invention relates to a heat-shrinkable polyester film and a packaging, and more specifically, aims to provide a heat-shrinkable polyester film which is suitably used for a purpose of labels of drink bottles, has a main shrinkage direction in a longer direction, exhibits a higher shrinkage ratio in the main shrinkage direction, has small difference in shrinkage ratio at a high temperature and a low temperature so as not likely to generate wrinkles or the like when being used as a label, and exhibits small over-time decrease in shrinkage ratio at a low temperature.

Means for Solving the Problems

The present invention includes following structures:

1. A heat-shrinkable polyester film, satisfying below requirements (1) to (4), wherein a main shrinkage direction is a longer direction, and the requirements are as follows:

(1) a hot water shrinkage ratio of the film when being immersed in hot water at 98° C. for 10 seconds in the film main shrinkage direction is 40% or more;

(2) difference between a shrinkage ratio of the film in the main shrinkage direction when being immersed in hot water at 70° C. for 10 seconds and the hot water shrinkage ratio at 98° C. in the main shrinkage direction is 0% or more and 20% or less;

(3) a main component is ethyleneterephthalate, and an amount of a diethyleneglycol (DEG) component is 10 mol % or more and 25 mol % or less with respect to 100 mol % of a polyhydric alcohol component in all of polyester resin that composes the film; and (4) difference between a hot water shrinkage ratio of the film in the main shrinkage direction, after the film is left under an atmosphere at a temperature of 40° C. and relative humidity of 85% for 28 days and is subsequently immersed in hot water at 70° C. for 10 seconds, and the hot water shrinkage ratio of the film before such time passage is 0% or more and 5% or less.

2. The heat-shrinkable polyester film according to above $1^{st}$, wherein a glass transition temperature of the film is 50° C. or more and 65° C. or less.

3. The heat-shrinkable polyester film according to above $1^{st}$ or $2^{nd}$, wherein, in shrinkage stress measurement with 90° C. hot air, maximum shrinkage stress of the film in the main shrinkage direction is 3 MPa or more and 20 MPa or less.

4. The heat-shrinkable polyester film according to any one of above $1^{st}$ to $3^{rd}$, wherein a natural shrinkage ratio of the film in the main shrinkage direction, after the film is left under an atmosphere at a temperature of 40° C. and relative humidity of 85% for 28 days, is 0.05% or more and 1.0% or less.

5. The heat-shrinkable polyester film according to any one of above $1^{st}$ to $4^{th}$, wherein a haze value is 4% or more and 13% or less.

6. A packaging, having a label derived from the heat-shrinkable polyester film according to any one of above $1^{st}$ to $5^{th}$ as at least a part of an outer circumference of a packaged object.

Effect of the Invention

The present invention can solve the above-described problems, and can provide a heat-shrinkable polyester film, which has sufficient shrinkability in a longer direction that is a main shrinkage direction, has small difference in shrinkage ratio at a high temperature and a low temperature, and exhibits small over-time decrease in shrinkage ratio at a low temperature. Due to the small difference in shrinkage ratio at a low temperature and a high temperature, rapid shrinkage is not likely to be caused and shrinkage unevenness or wrinkles are minimally generated, when shrinking the film in a state of being put around a bottle, thereby enabling to obtain the film with favorable finish. Further, since the over-time decrease in shrinkage ratio at a low temperature is small, shrinkage properties of the film are not degraded even during its long period storage after film formation.

MODE FOR CARRYING OUT THE INVENTION

The heat-shrinkable polyester film of the present invention satisfies following requirements (1) to (4), and a main shrinkage direction thereof is a longer direction.

(1) a hot water shrinkage ratio of the film when being immersed in hot water at 98° C. for 10 seconds in the film main shrinkage direction is 40% or more and 85% or less;

(2) difference between a hot water shrinkage ratio of the film in the main shrinkage direction when being immersed in hot water at 70° C. for 10 seconds and the hot water shrinkage ratio at 98° C. in the main shrinkage direction is 0% or more and 20% or less;

(3) a main component is ethyleneterephthalate, and an amount of a diethyleneglycol (DEG) component is 10 mol % or more and 25 mol % or less with respect to 100 mol % of a polyhydric alcohol component in all of polyester resin; and (4) difference between a hot water shrinkage ratio of the film in the main shrinkage direction, after the film is left under an atmosphere at a temperature of 40° C. and relative humidity of 85% for 28 days and is subsequently immersed in hot water at 70° C. for 10 seconds, and the hot water shrinkage ratio of the film before such time passage is 0% or more and 5% or less.

A heat-shrinkable film is usually obtained by conveying by rolls or the like and being drawn. At this time, a direction to convey the film is called as a longer direction (longitudinal direction), and a direction perpendicular to the longer direction is called as a width direction (transverse direction). A main shrinkage direction of the heat-shrinkable polyester film of the present invention is the longer direction.

Examples of a preferable drawing method for continuously manufacturing the heat-shrinkable polyester film of the present invention include a longitudinal uniaxial drawing using only a longitudinal drawing machine and biaxial drawing including longitudinal drawing after transverse drawing, but since the biaxial drawing requires large-scale equipment, the longitudinal uniaxial drawing is adopted. More specifically, the film is drawn at a magnification of twice to seven times in the longer direction by using heated rolls that are rotated at different speed at a temperature from Tg+5° C. or more to Tg+40° C. or less. At this time, for adding high shrinkability and low temperature shrinkability, diethyleneglycol (DEG) is preferably used as a polyhydric alcohol component of the film.

For providing a heat-shrinkable polyester film with high shrinkability, for example, homopolymer made of ethyleneterephthalate (PET) which is copolymerized with other polycarboxylic acid component or other polyhydric alcohol component has been used widely. As the other polyhydric alcohol component used to be copolymerized, for example, neopentylglycol and 1,4-cyclohexane dithanol are considered to be used widely, but it is acknowledged that, in the case of the film obtained by copolymerizing these components, shrinkability in a low temperature range of 70° C. or less is remarkably decreased over time under an environment at a temperature from a normal temperature to about 40° C. Whereas, the inventors of the present invention have found that, in the case of copolymerizing with diethyleneglycol, such over-time decrease in shrinkage ratio in the low temperature range can be suppressed. Further, for obtaining a resin material by copolymerizing with diethyleneglycol, any melting process which is essential for powder materials such as neopentylglycol is not required, because the diethyleneglycol is liquid at a normal temperature. Moreover, the diethyleneglycol has merits of having higher polymerization activity and generating less foam, which leads to deterioration of the productivity, during its polymerization than those of neopentylglycol.

The film of the present invention contains ethyleneterephthalate as a main component. The main component here means that the ethyleneterephthalate is contained by 50 mol % or more of total polymer components that compose the film. More preferably, the ethyleneterephthalate is contained by 70 mol % or more. By using the ethyleneterephthalate as the main component, the film can have excellent mechanical strength and transparency.

As a method for polymerizing polyethyleneterephthalate (hereinafter, may also be called solely as PET), any manufacturing method such as: a direct polymerization method in which terephthalic acid, ethyleneglycol and other dicarboxylic acid component and a diol component as necessary are reacted directly; and a transesterification method of transesterifying dimethylester of terephthalic acid (including methylester of other dicarboxylic acid as necessary) and ethyleneglycol (including other diol component as necessary) can be adopted.

Intrinsic viscosity of polyethyleneterephthalate is preferably within a range from 0.45 (dl/g) to 0.8 (dl/g). It is not preferable that the intrinsic viscosity is less than 0.45 (dl/g), because the polyethyleneterephthalate is crystalized due to its drawing so as to decrease its shrinkability. Further, it is not so preferable that the intrinsic viscosity is more than 0.8 (dl/g), because an increase in filtration pressure is enlarged, and high precision filtration becomes difficult.

As the dicarboxylic acid component other than the terephthalic acid that composes the polyester used for the film of the present invention, aromatic dicarboxylic acid such as isophthalic acid, naphthalenedicarboxylic acid and orthophthalic acid; aliphatic dicarboxylic acid such as adipic acid, azelaic acid, sebacic acid and decanedicarboxylic acid; alicyclic dicarboxylic acid; and the like can be exemplified. A content ratio of these dicarboxylic acid components other than the terephthalic acid is preferably 15 mol % or less, is more preferably 10 mol % or less, and is particularly preferably 4 mol % or less with respect to 100 mol % of the polycarboxylic acid components.

In the case where the polyester contains aliphatic dicarboxylic acid (for example, adipic acid, sebacic acid, decadicarboxylic acid or the like), a content thereof is preferably less than 3 mol %. The heat-shrinkable polyester film obtained by the use of the polyester which contains 3 mol % or more of the aliphatic dicarboxylic acid does not have sufficient film firmness for high-speed attachment.

Further, it is preferable that the polyester does not contain polycarboxylic acid of trivalence or more (for example, trimellitic acid, pyromellitic acid, their anhydrides or the like). The heat-shrinkable polyester film obtained by the use of the polyester which contains such polycarboxylic acid hardly achieves necessary shrinkability.

The diethyleneglycol is required to be contained by 10 mol % or more and 25 mol % or less with respect to 100 mol % of the polyhydric alcohol components that compose the polyester used for the film of the present invention. Effects of copolymerizing with the diethyleneglycol will be described below in detail.

As the polyhydric alcohol component other than the ethyleneglycol and the diethyleneglycol which compose the polyester used in the present invention, aliphatic diol such as 1-3-propanediol, 1-4-butanediol, neopentylglycol and hexanediol; alicyclic diol such as 1,4-cyclohexanedimethanol; aromatic diol such as bisphenol A; and the like can be exemplified. A content ratio of this polyhydric alcohol component other than the ethyleneglycol and the diethyleneglycol is preferably 9 mol % or less, more preferably 7 mol % or less, further preferably 4 mol % or less, and particularly preferably 0 mol % with respect to 100 mol % of the polyhydric alcohol component.

It is preferable that the polyester does not contain diol having 8 or more carbon atoms (for example, octanediol and the like) or polyhydric alcohol of trivalence or more (for example, trimethylolpropane, trimerytolethane, glycerin, diglycerin and the like). The heat-shrinkable polyester film obtained by the use of the polyester that contains such diol or such polyhydric alcohol hardly achieves necessary high shrinkability.

Further, when the heat-shrinkable polyester film of the present invention is treated with no load in hot water at 98° C. for 10 seconds, a heat shrinkage ratio (that is, a 98° C. hot water shrinkage ratio) thereof in the main shrinkage direction of the film, which is calculated by a following formula 1 from lengths of the film before and after the shrink, is preferably 40% or more.

Heat Shrinkage Ratio={(Length before Shrink−Length after Shrink)/Length before Shrink}×100 (%)  Formula 1

It is not preferable that the hot water heat shrinkage ratio at 98° C. in the main shrinkage direction is less than 40%, because, when using as a film for the purpose of a label of a drink bottle, its shrinkage amount is so small that wrinkles or sag of a label is generated after the heat shrink. The 98° C. hot water shrinkage ratio is more preferably 42% or more, and particularly preferably 45% or more.

A difference between the hot water shrinkage ratio at 70° C. in the main shrinkage direction, which is measured by a method similar to the above, and the hot water shrinkage ratio at 98° C. in the main shrinkage direction is preferably 20% or less. If the above-described difference in shrinkage ratio is 20% or less, low temperature shrinkability can be obtained, and rapid shrinkage can be suppressed during shrinkage finish for being used as a label for a drink bottle or the like, whereby generation of wrinkles and shrinkage unevenness can be suppressed. On the other hand, the above-described difference in shrinkage ratio is 20% or more, wrinkles or shrinkage unevenness is likely to be generated after the shrinkage finish. The difference between the 70° C. shrinkage ratio and the 98° C. shrinkage ratio is more preferably 17% or less, and is particularly preferably 15% or less.

The heat-shrinkable polyester film of the present invention preferably exhibits that a difference between: a shrinkage ratio of the film which is left under an atmosphere at a temperature of 40° C. and relative humidity of 85% for 28 days and is thereafter immersed in hot water at 70° C. for 10 seconds; and a shrinkage ratio thereof before the time passage is 0% or more and 5% or less. It is not preferable that the difference in shrinkage ratio is more than 5%, because a low temperature shrinkage ratio of the formed film becomes decreased by long-time storage, whereby wrinkles or shrinkage unevenness becomes likely to be generated when the film is shrunk as a label or the like. The difference in shrinkage ratio is more preferably 4% or less, and is particularly preferably 3% or less. It is more favorable that a lower limit of the difference in shrinkage ratio is lower, but the lower limit is considered to be 0%, because the shrinkage ratio is not likely to be increased after the time passage.

As described above, the film of the present invention contains ethyleneterephthalate as a main component, and the content of the diethyleneglycol is 10 mol % or more and 25 mol % or less with respect to 100 mol % of the polyhydric alcohol components. Usually, a glass transition temperature of a polyester heat-shrinkable film is about 75° C., but such a film hardly exhibits significant low temperature shrinkability, and wrinkles or shrinkage unevenness is likely to be generated while it is shrunk. Then, the inventors of the present invention have found that the glass transition temperature of the film is lowered by copolymerizing with diethyleneglycol. The reason why the glass transition temperature is lowered is not clear, but we assume that, by copolymerizing the diethyleneglycol into the polyethyleneterephthalate, regularity of polymer molecules are disturbed, whereby polymer molecular chains can be moved easily at a lower temperature. Further, it has been also known that high shrinkability at a high temperature can be obtained, unlike the case of using 1,4-butanediol or the like. Moreover, we have also found that over-time stability is favorable, and decrease in low temperature (70° C.) shrinkage ratio after the time passage is small. The reason for this is also unclear, but we assume from its molecular structure that, in an amorphous component related to the shrink of the film, diethyleneglycol constructs an amorphous molecular chain with higher rigidity than those of neopentylglycol, cyclohexanedimethanol and the like. Thus, an amorphous molecular chain that is oriented by being drawn is less relaxed over time, thereby not leading to the decrease in shrinkage ratio.

The content of diethyleneglycol is not preferably less than 10 mol %, because the above-described low temperature shrinkability cannot be attained. Also, the content of diethyleneglycol is not preferably more than 25 mol %, because heat resistance of the resin is decreased, and a problem of generating a foreign material during melt extrusion may be caused. The content of the diethyleneglycol is more preferably 11 mol % or more and 25 mol % or less, further preferably 12 mol % or more and 23 mol % or less, and particularly preferably 15 mol % or more and 20 mol % or less.

A glass transition temperature of the film of the present invention obtained by a DSC measurement is preferably 50° C. or more and 65° C. or less. If the glass transition temperature is 65° C. or more, the above-described low temperature shrinkability cannot be obtained, and wrinkles or shrinkage unevenness is likely to be generated during the shrink. On the other hand, the glass transition temperature is not preferably 50° C. or less, because blocking of labels each other is likely to be caused in a warmer of, for example, a vending machine or the like for heating for selling. The glass transition temperature of the film is more preferably 53° C. or more and 62° C. or less, and is particularly preferably 55° C. or more and 60° C. or less.

Further, in shrinkage stress measurement using hot air at 90° C., maximum shrinkage stress of the film of the present invention in its longer direction is 3 MPa or more and 20 MPa or less. If the maximum shrinkage is less than 3 MPa, the film is difficult to follow along a shape of a bottle when the film is shrunk in the state of being attached around the bottle or the like, thereby causing the generation of wrinkles. If the maximum shrinkage stress is more than 20 MPa, shrinking force becomes too strong, and thus causes deformation of a packaged object or the like. The maximum shrinkage stress is preferably 3 MPa or more and 10 MPa or less, more preferably 4 MPa or more and 9 MPa or less, and particularly preferably 5 MPa or more and 8 MPa or less.

Further, a natural shrinkage ratio of the film of the present invention in a film main shrinkage direction is preferably 0.05% or more and 1.0% or less, after the film is left in an atmosphere at a temperature of 40° C. and relative humidity of 85% for 28 days. Incidentally, the natural shrinkage ratio can be calculated by following Formula 2.

Natural Shrinkage Ratio={(Length before Aging−Length after Aging)/Length before Aging}×100 (%)  Formula 2

The natural shrinkage ratio is not preferably more than 1.0%, because the film wound in a roll is wound and tightened while it is stored, and wrinkles are likely to be generated to the film roll. Incidentally, it is more favorable that the natural shrinkage ratio is lower, but a lower limit thereof is considered to be about 0.05% in the light of measurement accuracy. Further, the natural shrinkage ratio is preferably 0.9% or less, and is particularly preferably 0.8% or less.

In addition, a haze value of the heat-shrinkable polyester film of the present invention is preferably 4% or more and 13% or less. The haze value is not preferably more than 13%, because transparency becomes poor, and appearance of a label formed of the film becomes poor. It is more preferable that the haze value is smaller, but a lower limit thereof is about 4%, by considering that a predetermined amount of lubricant is inevitably added to the film so as to provide practically necessary slipperiness. Incidentally, the haze value is more preferably 11% or less, and is particularly preferably 9% or less.

To the resin for forming the heat-shrinkable polyester film of the present invention, various kinds of additives, for example, waxes, antioxidants, antistatic agents, nucleating agents, viscosity reducers, heat stabilizers, coloring pigments, coloring inhibitors, ultraviolet absorbers and the like can be added as necessary.

To the resin for forming the heat-shrinkable polyester film of the present invention, fine particles as a lubricant that improves workability (slipperiness) of the film are preferably added. As the fine particles, any fine particles can be selected, and for example, as inorganic fine particles, silica, alumina, titanium dioxide, calcium carbonate, kaolin, barium sulfate and the like can be exemplified, and as organic fine particles, for example, acrylic resin particles, melamine resin particles, silicone resin particles, crosslinked polystyrene particles and the like can be exemplified. An average particle diameter of the fine particles can be appropriately selected as necessary in a range from 0.05 μm to 3.0 μm (in the case of using a coulter counter for the measurement).

As a method for blending the above-described particles into the resin for forming the heat-shrinkable polyester film, for example, the particles can be added in any step during manufacturing the polyester resin, but they are preferably added as a slurry obtained by dispersing the particles into ethyleneglycol or the like in a step of esterification or in a step after completing the transesterification and before starting a polycondensation reaction so as to promote the polycondensation reaction. Further, it is also preferable to adopt a method of blending the slurry obtained by dispersing the particles into ethyleneglycol, water or the like, with the polyester resin materials using a kneading extruder with a vent, a method of blending the dried particles with the polyester resin materials using a kneading extruder, or the like.

Also, the heat-shrinkable polyester film of the present invention can be subjected to corona treatment, coating treatment, flame treatment or the like in order to obtain favorable adhesiveness of its film surface.

A thickness of the heat-shrinkable polyester film of the present invention is not limited particularly, but preferably 5 μm to 100 μm, and more preferably 10 μm to 95 μm as a heat-shrinkable film for the purpose of labels of drink bottles and the like.

Moreover, the method for manufacturing the heat-shrinkable polyester film of the present invention is not limited at all, but for example, the film can be obtained by melting and extruding the above-described polyester materials by an extruder so as to form an undrawn film, and drawing the undrawn film uniaxially in a longer direction by a method described below.

When melting and extruding the material resin, the polyester materials are preferably dried by a drier such as a hopper dryer and a puddle dryer or a vacuum dryer. After drying the polyester materials in this manner, the polyester materials are melted at a temperature of 200° C. to 300° C. and are extruded into a film by an extruder. For this extrusion, any existing method such as a T-die method and a tubular method can be adopted.

Then, by quenching the sheet-shaped melted resin after the extrusion, an undrawn film can be obtained. Incidentally, as a method for quenching the melted resin, a method of casting the melted resin through a nozzle onto a rotating drum and quenching for solidifying the resin so as to obtain an substantially unoriented resin sheet can be adopted favorably.

Further, the obtained undrawn film is drawn in its longer direction in predetermined conditions as described below, whereby the heat-shrinkable polyester film of the present invention can be obtained. Hereinafter, preferable drawing for obtaining the heat-shrinkable polyester film of the present invention will be explained.

A usual heat-shrinkable polyester film is manufactured by drawing an undrawn film in a direction that is intended to be drawn. In the present invention, the undrawn film is drawn uniaxially in the longer direction that is the main shrinkage direction. The undrawn film is introduced into a longitudinal drawing machine in which plural roll groups are arranged in series, and is heated to a temperature of Tg+5° C. or more and +40° C. or less on a preheated roll (low speed roll). Thereafter, a low temperature roll (high speed roll) having speed higher than that of the preheated roll is provided downstream of the preheated roll, and the film is drawn in the longer direction by speed difference between the low speed roll and the high speed roll. A draw ratio at this time is not limited particularly, but twice to seven times is preferable. If the draw ratio is less than twice, a high shrinkage ratio is hardly obtained due to the material balance. In addition, it is not preferable that the draw ratio is more than seven times, because the film is likely to be broken during the film formation. The film is not preferably drawn in a width direction because large-scale equipment becomes required. Further, it is not preferable to treat the film by heat after the drawing so that the film can have high shrinkability.

Further, a method for heating the film before and during the drawing is not limited particularly, but the film may be heated by an infrared heater or a light converging infrared heater between the low speed roll and the high speed roll, in addition to the above-described method for heating the film on the roll.

Moreover, it is not preferable that the drawing temperature in the longer direction is less than Tg+5° C., because the film is likely to be broken during the drawing. Also, it is not preferable that the drawing temperature is more than Tg+40° C., because thermal crystallization of the film proceeds and the shrinkage ratio thereof is decreased. The drawing temperature is more preferably Tg+8° C. or more and Tg+37° C. or less, and is further preferably Tg+11° C. or more and Tg+34° C. or less.

EXAMPLES

Hereinafter, the present invention will be described in more detail by way of examples, but is not limited to modes of the examples at all, and modifications can be made as appropriate without departing from the gist of the invention. Compositions of raw materials used in Examples and Comparative Examples, conditions for manufacturing films in Examples and Comparative Examples, evaluation results of the films in Examples and Comparative Examples will be shown in Tables 1 and 2, respectively.

TABLE 1

| | Raw Material Composition of Polyester (mol %) | | | | | | |
|---|---|---|---|---|---|---|---|
| | Dicarboxylic Acid Component | Polyhydric Alcohol Component | | | | | Adding Amount of Lubricant |
| | DMT | EG | DEG | NPG | CHDM | BD | (ppm) |
| Polyester A | 100 | 100 | 0 | 0 | 0 | 0 | 0 |
| Polyester B | 100 | 100 | 0 | 0 | 0 | 0 | 7200 |
| Polyester C | 100 | 40 | 60 | 0 | 0 | 0 | 0 |
| Polyester D | 100 | 40 | 60 | 0 | 0 | 0 | 7200 |
| Polyester E | 100 | 70 | 0 | 30 | 0 | 0 | 0 |
| Polyester F | 100 | 75 | 0 | 0 | 25 | 0 | 0 |
| Polyester G | 100 | 0 | 0 | 0 | 0 | 100 | 0 |

Abbreviations in the table are as follows:
* DMT    Dimethylterephthalate
* EG     Ethyleneglycol
* NPG    Neopentylglycol
* CHDM   1,4-Cyclohexanedimethanol
* BD     1,4-Butanediol

TABLE 2

| | Raw Material (Mixed Weight Ratio) | Polyhydric Alcohol Component (mol %) | | | | | Glass Transition Temperature (° C.) | Longitudinal Draw Patio | Film Thickness (μm) | Haze (%) |
|---|---|---|---|---|---|---|---|---|---|---|
| | | EG | DEG | NPG | CHDM | BD | | | | |
| Example 1 | A/C/D = 82/12/6 | 89 | 11 | 0 | 0 | 0 | 64 | 2 | 40 | 6.5 |
| Example 2 | A/C/D = 82/12/6 | 89 | 11 | 0 | 0 | 0 | 64 | 3 | 27 | 6.2 |
| Example 3 | A/C/D = 82/12/6 | 89 | 11 | 0 | 0 | 0 | 64 | 4 | 20 | 5.9 |
| Example 4 | A/C/D = 73/21/6 | 84 | 16 | 0 | 0 | 0 | 60 | 2 | 40 | 6.4 |
| Example 5 | A/C/D = 73/21/6 | 84 | 16 | 0 | 0 | 0 | 60 | 3 | 27 | 6.2 |
| Example 6 | A/C/D = 73/21/6 | 84 | 16 | 0 | 0 | 0 | 60 | 4 | 20 | 5.8 |
| Example 7 | A/C/D = 60/34/6 | 76 | 24 | 0 | 0 | 0 | 55 | 2 | 40 | 6.5 |
| Example 8 | A/C/D = 60/34/6 | 76 | 24 | 0 | 0 | 0 | 55 | 3 | 27 | 5.1 |
| Example 9 | A/C/D = 60/34/6 | 76 | 24 | 0 | 0 | 0 | 55 | 4 | 20 | 5.8 |

TABLE 2-continued

| | | | | | | | | | | |
|---|---|---|---|---|---|---|---|---|---|---|
| Comparative Example 1 | A/C/D = 90/4/6 | 94 | 6 | 0 | 0 | 0 | 69 | 3 | 27 | 6.2 |
| Comparative Example 2 | A/B/E = 61/6/33 | 90 | 0 | 10 | 0 | 0 | 75 | 3 | 27 | 6 |
| Comparative Example 3 | A/B/F = 54/6/40 | 90 | 0 | 0 | 10 | 0 | 75 | 3 | 27 | 6.1 |
| Comparative Example 4 | A/B/G = 74/6/20 | 80 | 0 | 0 | 0 | 20 | 68 | 3 | 27 | 6.2 |
| Comparative Example 5 | A/B/G = 64/6/30 | 70 | 0 | 0 | 0 | 30 | 64 | 3 | 27 | 6.2 |

| | Raw Material (Mixed Weight Ratio) | 98° C. Longitudinal Draw Ratio (%) | 70° C. Longitudinal Draw Ratio (%) | Difference in Shrinkage Ratio | 70° C. Shrinkage Ratio after Shrink (%) | Difference in Shrinkage Ratio between before and after Time Passage (%) | Shrinkage stress (MPa) | Natural shrinkage ratio (%) | Shrinkage finish evaluation before time passage | Shrinkage finish evaluation after time passage |
|---|---|---|---|---|---|---|---|---|---|---|
| Example 1 | A/C/D = 82/12/6 | 42 | 23 | 19 | 21 | 2 | 4.8 | 1 | B | B |
| Example 2 | A/C/D = 82/12/6 | 50 | 35 | 15 | 33 | 2 | 6.4 | 0.9 | A | A |
| Example 3 | A/C/D = 82/12/6 | 45 | 35 | 10 | 33 | 2 | 7.5 | 0.8 | A | A |
| Example 4 | A/C/D = 73/21/6 | 47 | 27 | 19 | 23 | 4 | 3.9 | 0.9 | B | B |
| Example 5 | A/C/D = 73/21/6 | 62 | 44 | 18 | 40 | 4 | 5.4 | 0.8 | A | A |
| Example 6 | A/C/D = 73/21/6 | 56 | 47 | 9 | 45 | 2 | 6.5 | 0.6 | A | A |
| Example 7 | A/C/D = 60/34/6 | 50 | 32 | 18 | 32 | 0 | 3.2 | 0.8 | B | B |
| Example 8 | A/C/D = 60/34/6 | 71 | 55 | 16 | 51 | 4 | 4.7 | 0.6 | A | A |
| Example 9 | A/C/D = 60/34/6 | 69 | 60 | 9 | 57 | 3 | 5.7 | 0.5 | A | A |
| Comparative Example 1 | A/C/D = 90/4/6 | 40 | 15 | 25 | 13 | 2 | 9.0 | 1 | C | C |
| Comparative Example 2 | A/B/E = 61/6/33 | 52 | 33 | 19 | 11 | 22 | 4.6 | 1.2 | A | C |
| Comparative Example 3 | A/B/F = 54/6/40 | 53 | 35 | 18 | 10 | 25 | 4.3 | 1.2 | A | C |
| Comparative Example 4 | A/B/G = 74/6/20 | 35 | 16 | 19 | 5 | 11 | 4.4 | 1.2 | C | C |
| Comparative Example 5 | A/B/G = 64/6/30 | 30 | 16 | 14 | 2 | 14 | 4.1 | 1.3 | C | C |

Further, methods for evaluating each film were as described below.

[Tg (Glass Transition Point)]

A glass transition point of each film was measured using a differential scanning calorimetry analyzer (DSC220 produced by Seiko Instruments & Electronics Ltd.) by: putting 5 mg of each undrawn film into a sample pan; closing a lid of the pan; and increasing its temperature at a temperature increasing rate of 10° C./minute from −40° C. to 120° C. under a nitrogen gas atmosphere. Tg (° C.) was obtained based on JIS-K7121-1987.

[Intrinsic Viscosity (IV)]

After dissolving 0.2 g of polyester into 50 ml of mixed solvent of phenol/1,1,2,2-tetrachloroethane (60/40 (weight ratio)), intrinsic viscosity of the solution was measured by an Ostwald viscometer at 30° C. A unit of the viscosity is dl/g.

[Heat Shrinkage Ratio (Hot Water Shrinkage Ratio)]

After cutting each film into a square of 10 cm×10 cm and treating the cut film in hot water at a predetermined temperature±0.5° C. with no load for 10 seconds so as to shrink the cut film by heat, dimensions of the film in its longitudinal direction (longer direction) and its transverse direction (width direction) were measured, whereby each heat shrinkage ratio was obtained by above-described Formula 1. Each of the films of Examples and Comparative Examples of the present invention is a film of which the longer direction is a main shrinkage direction, and heat shrinkage ratio of the film in the longitudinal direction is shown in Table 2. Further, difference in shrinkage ratio between a shrinkage ratio in the longitudinal direction at 98° C. and a shrinkage ratio in the longitudinal direction at 70° C. is represented as "difference in shrinkage ratio".

[Over-Time Change in Shrinkage Ratio]

After leaving the obtained film under an atmosphere at 40° C. and 85% RH for 28 days (over time), the hot water shrinkage ratio was measured in hot water at 70° C. so as to obtain its 70° C. hot water shrinkage ratio in its longer direction. Thereby, difference in 70° C. hot water shrinkage ratio in its longer direction before the time passage and after the time passage, which is represented as "difference in shrinkage ratio between before and after the time passage".

[Shrinkage Stress]

A sample was cut out from the heat-shrinkable film to have a length of 200 mm in its main shrinkage direction and a width of 20 mm, and shrinkage stress of the sample was measured by a strength and elongation measuring device with a heating furnace (TESILON (Registered Trademark of ORIENTEC CORPORATION)) produced by Toyo Baldwin Co. Ltd. (current company name is ORIENTEC CORPORATION). The heating furnace was heated at 90° C. in advance, and a distance between chucks was set to be 100 mm. After stopping blast in the heating furnace temporarily, a door of the heating furnace was opened so as to attach the sample to the chuck, the door of the heating furnace was subsequently closed swiftly, and blast was started again. The shrinkage stress was measured for 30 seconds or more, and a maximum value during the measurement was determined as maximum shrinkage stress (MPa).

[Natural Shrinkage Ratio]

The obtained film was cut out to have a size of its main shrinkage direction×perpendicular direction=200 mm×30 mm, and was left under an atmosphere at 40° C. and 85% RH for 28 days (over time). Thereafter, a shrinkage amount in the longer direction (main shrinkage direction) of the film was measured so as to calculate a natural shrinkage ratio by following Formula 2.

Natural Shrinkage Ratio={(Length before Aging−Length after Aging)/Length before Aging}×100 (%)   Formula 2

[Haze]

Haze was measured by a haze meter (300A produced by NIPPON DENSHOKU INDUSTRIES Co., LTD.) according to JIS-K-7136. Incidentally, the measurement was conducted twice, and an average value thereof was obtained.

[Shrinkage Finish Evaluation of Label (Before and After Time Passage)]

Three-color printing was conducted on a heat-shrinkable film in advance by ink in grass-green, gold and white colors produced by Toyo Ink Manufacturing Co., Ltd. Both end portions of the printed film were adhered to each other by a hotmelt adhesive so as to produce a cylindrical label (a cylindrical label of which an outer circumferential direction is a main shrinkage direction of the heat-shrinkable film, which has an outer circumferential length that is 1.05 times of an outer circumferential length of a bottle to be attached therearound). Thereafter, the cylindrical label was put around the PET bottle of 500 ml (a body diameter was 62 mm, and a minimum diameter of a neck portion was 25 mm), and was shrunk by heat using a steam tunnel (type; SH-1500-L) produced by Fuji Astec Inc. at a zone temperature of 80° C. for a passing time of 2.0 seconds, whereby the label was attached around the bottle. Incidentally, for the attachment, the label was adjusted to be positioned so that one of the ends of the label may be at a part having a diameter of 50 mm in the neck portion. The finish of the label after the shrink was evaluated by visual observation, and criteria thereof were as follows.

A: Finish was best, and no wrinkle was found.
B: Finish was good, and one or two wrinkles were found.
C: Finish was poor, and three or more wrinkles were found or shrinkage was lacked.

This shrinkage finish evaluation was conducted to the film before the time passage and the film after the time passage, which was left under the same conditions as those of the above-described over-time shrinkage ratio change evaluation (under the atmosphere at 40° C. and 85% RH for 28 days).

Further, polyester used in Examples and Comparative Examples was as follows.

Synthetic Example A

Into an autoclave made of stainless steel, which was provided with an agitator, a thermometer and a partial reflux cooling device, 100 mol % of dimethylterephthalate (DMT) as a dicarboxylic acid component and 100 mol % of ethyleneglycol (EG) as a glycol component were prepared so that the ethyleneglycol may be 2.2 times of the dimethylterephthalate in mol ratio, and 0.05 mol % (with respect to the acid components) of zinc acetate as a transesterification catalyst and 0.225 mol % (with respect to the acid components) of antimony trioxide as a polycondensation catalyst were added, whereby a transesterification reaction was caused while distilling generated methanol to outside the system. Thereafter, a polycondensation reaction was caused at 280° C. under a reduced pressure condition of 26.7 Pa, thereby obtaining Polyester A with intrinsic viscosity of 0.62 dl/g. Compositions were shown in Table 1.

Synthetic Examples B to D

By a method similar to that in Synthetic Example A, Polyester B to D shown in Table 1 were obtained. For manufacturing Polyester B and D, $SiO_2$ (Silysia 266, produced by FUJI SILYSIA CHEMICAL LTD.; average particle diameter of 1.5 μm) was added as a lubricant by a proportion of 7200 ppm with respect to an amount of the polyester. Incidentally, in the Table, DEG represents diethyleneglycol, NPG represents neopentylglycol, CHDM represents 1,4-cyclohexanedimethanol, and BD represents 1,4-butanediol. Intrinsic viscosity of the respective polyester was B: 0.62 dl/g, C: 0.65 dl/g, D: 0.65 dl/g, E: 0.74 dl/g, F: 0.64 dl/g and G: 1.24 dl/g. Incidentally, the respective polyester was transformed into chip shapes as appropriate.

Example 1

The above-described Polyester A, Polyester C and Polyester D were mixed in a weight ratio of 82:12:6, and were put into an extruder. Thereafter, the mixed resin was melted at 280° C., was extruded from a T-die, and was quenched by being wound around a rotating metal roll that was cooled to have a surface temperature of 30° C., thereby obtaining an undrawn film with a thickness of 80 μm. Tg of the undrawn film was 64° C. Thereafter, the undrawn film was introduced into a longitudinal drawing machine in which plural roll groups were arranged in series, was preheated to 82° C. (Tg+18° C.) on a preheated roll, and was subsequently drawn twice by utilizing speed difference between the rolls. Thereafter, the longitudinally drawn film was cooled forcibly by a cooling roll of which surface temperature was set at 25° C. Then, by cutting and removing the both end portions of the cooled film, a uniaxially drawn film of about 40 μm was formed continuously over a predetermined length, thereby obtaining a film roll made of a heat-shrinkable polyester film. Then, properties of the obtained film were evaluated by the above-described methods. Evaluation results are shown in Table 2. As a result of the evaluation, the film had sufficient shrinkability and favorable low temperature shrinkability, so that its shrinkage finish was also favorable, and over-time decrease of its 70° C. shrinkage ratio was small.

Example 2

A film was manufactured similarly to Example 1 except that a draw ratio of the film in its longer direction was three times. A thickness of the film after the shrink was 27 μm. As a result of the evaluation, the film had sufficient shrinkability and favorable low temperature shrinkability, so that its shrinkage finish was also favorable, and over-time decrease of its 70° C. shrinkage ratio was small.

Example 3

A film was manufactured similarly to Example 1 except that a draw ratio of the film in its longer direction was four times. A thickness of the film after the shrink was 20 μm. As a result of the evaluation, the film had sufficient shrinkability and favorable low temperature shrinkability, so that its shrinkage finish was also favorable, and over-time decrease of its 70° C. shrinkage ratio was small.

Example 4

A film was manufactured similarly to Example 1 except that a weight ratio of the polyester was Polyester A:Polyester C:Polyester D=73:21:6, and the polyester was preheated to 78° C. on the preheated roll. At this time, Tg of the undrawn film was 60° C. As a result of the evaluation, the film had sufficient shrinkability and favorable low temperature shrinkability, so that its shrinkage finish was also favorable, and over-time decrease of its 70° C. shrinkage ratio was small.

Example 5

A film was manufactured similarly to Example 4 except that a draw ratio of the film in its longer direction was three times. A thickness of the film after the shrink was 27 µm. As a result of the evaluation, the film had sufficient shrinkability and favorable low temperature shrinkability, so that its shrinkage finish was also favorable, and over-time decrease of its 70° C. shrinkage ratio was small.

Example 6

A film was manufactured similarly to Example 4 except that a draw ratio of the film in its longer direction was four times. A thickness of the film after the shrink was 20 µm. As a result of the evaluation, the film had sufficient shrinkability and favorable low temperature shrinkability, so that its shrinkage finish was also favorable, and over-time decrease of its 70° C. shrinkage ratio was small.

Example 7

A film was manufactured similarly to Example 1 except that a weight ratio of the polyester was Polyester A:Polyester C:Polyester D=60:34:6, and the polyester was preheated to 73° C. on the preheated roll. At this time, Tg of the undrawn film was 55° C. As a result of the evaluation, the film had sufficient shrinkability and favorable low temperature shrinkability, so that its shrinkage finish was also favorable, and over-time decrease of its 70° C. shrinkage ratio was small.

Example 8

A film was manufactured similarly to Example 7 except that a draw ratio of the film in its longer direction was three times. A thickness of the film after the shrink was 27 µm. As a result of the evaluation, the film had sufficient shrinkability and favorable low temperature shrinkability, so that its shrinkage finish was also favorable, and over-time decrease of its 70° C. shrinkage ratio was small.

Example 9

A film was manufactured similarly to Example 7 except that a draw ratio of the film in its longer direction was four times. A thickness of the film after the shrink was 20 µm. As a result of the evaluation, the film had sufficient shrinkability and favorable low temperature shrinkability, so that its shrinkage finish was also favorable, and over-time decrease of its 70° C. shrinkage ratio was small.

Comparative Example 1

A film was manufactured similarly to Example 2 except that a weight ratio of the polyester was Polyester A:Polyester C:Polyester D=90:4:6, and the polyester was preheated to 87° C. on the preheated roll. At this time, Tg of the undrawn film was 69° C. As a result of the evaluation, the film had sufficient shrinkability at a high temperature but had low shrinkability at a low temperature, so that wrinkles were generated during the shrink both before and after the time passage, and favorable finish was not obtained.

Comparative Example 2

A film was manufactured similarly to Example 2 except that a weight ratio of the polyester was Polyester A:Polyester B:Polyester E=61:6:33, and the polyester was preheated to 93° C. on the preheated roll. At this time, Tg of the undrawn film was 75° C. As a result of the evaluation, the film had sufficient shrinkability and exhibited favorable shrinkage finish, but its low temperature shrinkability was decreased after the time passage, so that wrinkles were generated during the shrink, and favorable finish was not obtained. Also, its over-time natural shrinkage ratio was high.

Comparative Example 3

A film was manufactured similarly to Example 2 except that a weight ratio of the polyester was Polyester A:Polyester B:Polyester F=54:6:40, and the polyester was preheated to 93° C. on the preheated roll. At this time, Tg of the undrawn film was 75° C. As a result of the evaluation, the film had sufficient shrinkability and exhibited favorable shrinkage finish, but its low temperature shrinkability was decreased after the time passage, so that wrinkles were generated during the shrink, and favorable finish was not obtained. Also, its over-time natural shrinkage ratio was high.

Comparative Example 4

A film was manufactured similarly to Example 2 except that a weight ratio of the polyester was Polyester A:Polyester B:Polyester G=74:6:22, and the polyester was preheated to 86° C. on the preheated roll. At this time, Tg of the undrawn film was 68° C. As a result of the evaluation, sufficient shrinkability was not obtained, and shrinkage was lacked, so that favorable finish was not obtained both before and after the time passage. Also, its over-time natural shrinkage ratio was high.

Comparative Example 5

A film was manufactured similarly to Example 2 except that a weight ratio of the polyester was Polyester A:Polyester B:Polyester G=64:6:30, and the polyester was preheated to 82° C. on the preheated roll. At this time, Tg of the undrawn film was 64° C. As a result of the evaluation, sufficient shrinkability was not obtained, and shrinkage was lacked, so that favorable finish was not obtained both before and after the time passage. Also, its over-time natural shrinkage ratio was high.

INDUSTRIAL APPLICABILITY

The heat-shrinkable polyester film of the present invention has excellent properties as described above, and thus can be favorably used for a purpose of labels of bottles and the like, so that a packaging using the film has good appearance. Further, the film exhibits small over-time change in shrinkage ratio, whereby its superior properties are not lost even if its film roll is stored for a long period of time.

The invention claimed is:

1. A heat-shrinkable polyester film comprising a polyester resin with a dicarboxylic acid component and a diol component, wherein the dicarboxylic acid component of the polyester resin is terephthalic acid, dimethylester of terephthalic acid, or a combination thereof, wherein the diol component of the polyester resin is an ethylene glycol and a diethylene glycol, and wherein the film satisfies requirements (1) to (4), wherein a main shrinkage direction is a longer direction:

(1) a hot water shrinkage ratio of the film when being immersed in hot water at 98° C. for 10 seconds in the film main shrinkage direction is 40% or more;

(2) difference between a hot water shrinkage ratio of the film in the main shrinkage direction when being immersed in hot water at 70° C. for 10 seconds and the hot water shrinkage ratio at 98° C. in the main shrinkage direction is 0% or more and 20% or less;

(3) a main component is ethyleneterephthalate, and an amount of a diethyleneglycol component is 10 mol % or more and 25 mol % or less with respect to 100 mol % of a polyhydric alcohol component in all of the polyester resin that composes the film; and (4) difference between a hot water shrinkage ratio of the film in the main shrinkage direction, after the film is left under an atmosphere at a temperature of 40° C. and relative humidity of 85% for 28 days and is subsequently immersed in hot water at 70° C. for 10 seconds, and the hot water shrinkage ratio of the film before such time passage is 0% or more and 5%% or less.

2. The heat-shrinkable polyester film according to claim 1, wherein a glass transition temperature of the film is 50° C. or more and 65° C. or less.

3. The heat-shrinkable polyester film according to claim 2, wherein, in shrinkage stress measurement with 90° C. hot air, maximum shrinkage stress of the film in the main shrinkage direction is 3 MPa or more and 20 MPa or less.

4. The heat-shrinkable polyester film according to claim 3, wherein a natural shrinkage ratio of the film in the main shrinkage direction, after the film is left under an atmosphere at a temperature of 40° C. and relative humidity of 85% for 28 days, is 0.05% or more and 1.0% or less.

5. The heat-shrinkable polyester film according to claim 4, wherein a haze value is 4% or more and 13% or less.

6. The heat-shrinkable polyester film according to claim 1, wherein, in shrinkage stress measurement with 90° C. hot air, maximum shrinkage stress of the film in the main shrinkage direction is 3 MPa or more and 20 MPa or less.

7. The heat-shrinkable polyester film according to claim 1, wherein a natural shrinkage ratio of the film in the main shrinkage direction, after the film is left under an atmosphere at a temperature of 40° C. and relative humidity of 85% for 28 days, is 0.05% or more and 1.0% or less.

8. The heat-shrinkable polyester film according to claim 1, wherein a haze value is 4% or more and 13% or less.

9. A packaging, comprising a label derived from the heat-shrinkable polyester film according to claim 1 as at least a part of an outer circumference of a packaged object.

10. A packaging, comprising a label derived from the heat-shrinkable polyester film according to claim 2 as at least a part of an outer circumference of a packaged object.

11. A packaging, comprising a label derived from the heat-shrinkable polyester film according to claim 3 as at least a part of an outer circumference of a packaged object.

12. A packaging, comprising a label derived from the heat-shrinkable polyester film according to claim 4 as at least a part of an outer circumference of a packaged object.

13. A packaging, comprising a label derived from the heat-shrinkable polyester film according to claim 5 as at least a part of an outer circumference of a packaged object.

14. A packaging, comprising a label derived from the heat-shrinkable polyester film according to claim 6 as at least a part of an outer circumference of a packaged object.

15. A packaging, comprising a label derived from the heat-shrinkable polyester film according to claim 7 as at least a part of an outer circumference of a packaged object.

16. A packaging, comprising a label derived from the heat-shrinkable polyester film according to claim 8 as at least a part of an outer circumference of a packaged object.

* * * * *